United States Patent Office 3,496,272
Patented Feb. 17, 1970

3,496,272
ESTER OF 3-(2-PROPYNYLOXY)-ESTRADIOL
Gunther Kruger, St. Laurent, Quebec, Canada, assignor to American Home Products Corporation, New York, N.Y., a corporation of Delaware
No Drawing. Filed Jan. 23, 1968, Ser. No. 699,810
Int. Cl. A01n 17/14, 169/08, 169/12
U.S. Cl. 424—238                                   4 Claims

ABSTRACT OF THE DISCLOSURE

There is disclosed herein 3-(2-propynyloxy)-estra-1,3,5(10)-trien-17β-ol pivalate, a potent long-acting estrogen. Methods for its preparation and use, as well as methods for preparing edible bait compositions containing said compound and useful in rodent control are also given.

This invention relates to a new estrogen, 3-(2-propynyloxy)estra - 1,3,5 - (10) - trien - 17β-ol-pivalate, various methods for its synthesis, to its use as an agent for the control of rodent populations and to edible bait compositions containing said compound and used in rodent control.

The compound of this invention, 3-(2-propynyloxy)-estra-1,3,5(10)-trien-17β-ol-pivalate, is an orally active, long acting estrogen and, as such, is particularly useful as an agent for the control of rodents. It has been known for some time that estrogens induce marked genital changes and sterility in rats, see Green et al., Am. J. Anat., vol. 67 p. 305 (1940) and Wilson, Anat. Rec., vol. 86, p. 341 (1943). Subsequent studies with estrogens have demonstrated their effectivness in curtailing the reproductive capacity of rats. For example, Maqueo and Kincl, Acta. Endocrinol., vol. 46, p. 25 (1964) have demonstrated that estrogen treatment of the newborn male rat produces atrophy of the testes and sex organs and sterilizes the animals. Saunders, Endocrinology, vol. 80, p. 447 (1967) has described a dose-response relationship between litter size and the amounts of estrogen administered to the pregnant or lactating mother: estrogen administration diminished both the number of litters and the litter size and, moreover, the female pups failed to reproduce in subsequent mating experiments. In connection with these data it is significant to note that several investigators have reported experiments in which estrogens were tranmitted from the mother to the pups through the mother's milk, see Hain, Quart. J. Exper. Physiol., vol. 25, p. 303 (1935), and Mayer and Duluc, Compt. Rend., vol. 264, No. 16D, p. 2043 (1967). In addition the administration of estrogens to pregnant female rats can cause resorption or abortion of the fetus depending on the particular period of administration during gestation (see Duverger-Nedellec, Compt. Rend., vol. 246, No. 16D, p. 2039 (1967). Furthermore, it is well known that administration of estrogen to the rat prevents pregnancy.

Thus, it has been demonstrated that exposure of rats to exogenous estrogen has profound and detrimental effects on the reproductive capacity of the rat and that these effects, as a whole, are not limited by age or sex nor are they immediately apparent. The fact that those deleterious effects on the reproductive capacity of the rat are not immediately apparent prevents the animal from avoiding the bait and the problem of bait shyness does not arise. These qualities suggest that estrogens are useful to control rat populations in infested areas. Furthermore, estrogens have many other properties which make them suitable for this purpose; for example, good stability, and tastelessness. Furthermore, estrogens do not cause skin irritations in humans, and they are not known to produce an acquired tolerance in animals. These properties have prompted several investigators to study mestranol. 3-methoxy-17α-ethynylestradiol, as a rodent control agent. These studies demonstrated that mestranol is effective when applied in a bait to the rat population two or three times a week (see Chem. & Eng. News, Mar. 13, p. 23 (1967)). However, the need for frequent applications of mestranol represents a distinct handicap in any large scale attempt to control the rodent population with this agent, since under actual field conditions the wild rat can not be expected to return regularly to the same food source.

On the other hand, the novel compound of this invention 3-(2-propynyloxy)estra-1,3,5(10)trien-17β-ol pivalate, when administered orally to rats has been found to exhibit at least 20 times the duration of activity found for 3-methoxy-17α-ethynylestradiol (mestranol). This is all the more surprising because neither the known estradiol 17-pivalate nor the known 3-propnyloxy-estradiol exhibit this long duration of activity following oral administration. The especially long-acting properties of the compound of this invention following oral administration allow said compound to effect the same degree of control on the rodent population with less frequent exposure of the animals to the active agent than has hitherto been possible with 3-methoxy-17α-ethynylestradiol.

Because of this surprisingly long duration of activity following oral administration, the compound of this invention may be used as a rodent control agent by placing it in a bait in which the active ingredient is present in a concentration of 0.01 to 1.0 percent. The bait consists of an edible carrier preferably a highly palatable food to rodents, and may be a mixture of corn meal, cracked corn, cereal grains, meat or fish scraps, bread crumbs, pellets of prepared cereals, vegetable oils, fish oils, powdered sugar, molasses, and such condiments as salt and spices. The bait thus prepared is placed in an accessible location in an area frequented by rodents.

Furthermore, it is interesting to note that, since 17-esters of estradiol have found extensive application as long-acting estrogens by the intramuscular, but not the oral route (see Cutting in "Handbook of Pharmacology," 2nd ed., Appleton-Century-Craft, 1964, pp. 349–354). The prolonged estrogenic activity of the compound of this invention by peroral administration is exceptional and surprising.

For the preparation of the compound of this invention we have found it convenient to use as starting material, 6β,19-epoxy-17β-hydroxyandrost-4-en-3-one, I, described by Heusler et al., Experientia, 18, 464, 1962.

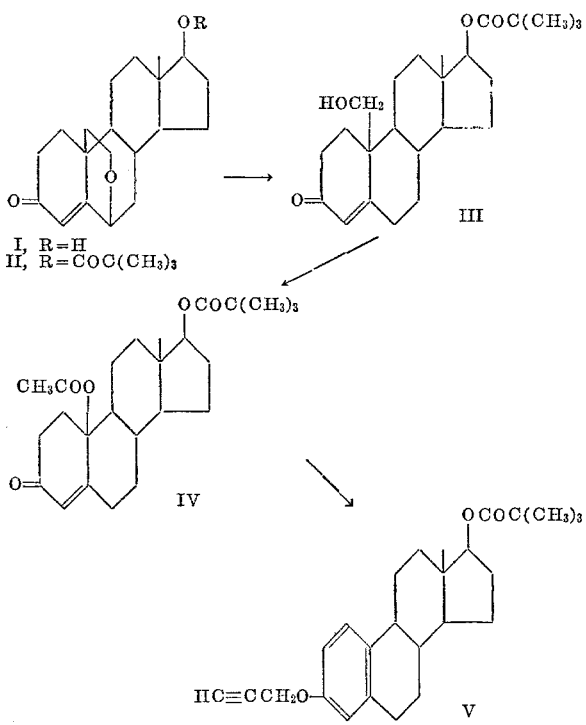

I, R=H
II, R=COC(CH₃)₃

This starting material is converted to its corresponding 17-pivalate II by treatment with pivaloyl chloride or pivalic anhydride in pyridine solution.

Alternatively, the pivalate II may be obtained from 5α-chloro-6β,19-epoxy-3β-hydroxyandrostan-17-one 3-acetate, prepared as described by Ueberwasser et al. in Helv. Chim. Acta., 46, 344 (1963), which is reduced to the corresponding 17-hydroxy derivative; the latter compound is esterified with pivaloyl chloride and selectively hydrolyzed to yield the corresponding 5α-chloro-6β,19-epoxyandrostane-3β,17β-diol 17-pivalate; oxidation of the latter compound and elimination of hydrogen chloride yields the pivalate II by this alternate route.

The pivalate II is then reduced with zinc dust by the method of Ueberwasser et al., Helv. Chim. Acta., 46, 344, 1963, to afford the intermediate, 17β,19-dihydroxyandrost-4-en-3-one 17-pivalate, III, which may be oxidized with lead tetraacetate in the manner described by Amorosa et al., Helv. Chim. Acta., 45, 2674, 1962 to yield 10β,17β-dihydroxyestr-4-en-3-one 10-acetate 17-pivalate, IV. Treatment of the latter compound with an excess of 2-propyn-1-ol in the presence of an acid catalyst, such as sulfuric acid, yields the compound of this invention, 3-(2-propynyloxy)estra-1,3,5(10)-trien-17β-ol 17-pivalate, V.

We are also able to synthesize the compound of this invention, V, by the following three alternate methods:

(1) 3-(2-propynyloxy)estra-1,3,5(10)-trien-17-one, described by Busby et al., J. Med. Chem., 7, 755, 1964, is reduced with sodium borohydride to give 3-(2-propynyloxy)-estra-1,3,5(10)-trien-17β-ol, which is readily acylated with pivaloyl chloride, or pivalic anhydride in pyridine solution to yield the compound of this invention, V.

(2) Estra-1,3,5(10)-trien-3,17β-diol, described by Butenandt et al., J. Physiol. Chem., 248, 129, 1937, is converted to its 3,17-dipivalate by treatment with pivaloyl chloride or pivalic anhydride in pyridine solution. The dipivalate, thus prepared, may be preferentially hydrolyzed at the 3-position by conventional hydrolysis methods such as treatment with dilute hydrochloric acid or dilute sodium hydroxide at room temperature (the 17-pivalate being stable under these condition) or alternatively the 3-phenolic group can be specifically generated by an exchange reaction with methanol in the presence of sodium methoxide, to yield estra-1,3,5(10)-trien-3,17β-diol 17-pivalate. The latter compound yields the compound of this invention when treated with 3-bromopropyne by the method used for the preparation of 3-(2-propynyloxy)estra-1,3,5(10)trien-17-one, described above.

(3) Estra-1,3,5(10)-triene-3,17β-diol, described by Butenandt et al., cited above, may be selectively etherified at the hydroxyl group in position B by treatment with 3-bromopropyne by the method used for the preparation of 3-(2-propynyloxy)estra-1,3,5(10)trien-17-one, described above, to yield 3-(2-propynyloxy)estra-1,3,5(10)-trien-17β-ol which can be acylated with pivaloyl chloride or pivalic anhydride as described above in alternative method 1, to give the compound of this invention.

The following examples will illustrate the scope of this invention.

EXAMPLE 1

6β,19-epoxy-17β-hydroxyandrost-4-en-3-one 17-pivalate (II)

(a) From 6β,19-epoxy-17β-hydroxyandrost-4-en-3-one: A solution of 5.0 g. of 6β,19-epoxy-17β-hydroxyandrost-4-en-3-one in 20 ml. of pyridine is heated with 7.5 ml. of pivaloyl chloride at 100° C. under nitrogen for two hours. The reaction mixture is diluted with 100 ml. of water and allowed to stand at room temperature for one hour during which time the supernatant oil crystallized. The crystals are collected, dried at 60° C. and recrystallized from methanol from methanol to afford the title compound; M.P. 157–158° C., $\lambda_{max}^{EtOH}$ 238 mμ ( ϵ 14,300)

(b) From 5α-chloro-6β,19-epoxy-3β-hydroxyandrostan-17-one 3-acetate: To a solution of 10 g. of 5α-chloro-6β,19-epoxy-3β-hydroxyandrostan-17-one 3-acetate in 30 ml. of methanol at 0° C., 0.80 g. of sodium borohydride is added over 2 minutes with stirring. The mixture is stirred for another 30 minutes in an ice bath, and then poured into 30 ml. of 2 N aqueous sulfuric acid. The precipitate is filtered off, washed well with water and dried at 80° C. in high vacuum for 16 hours yielding 9.0 g. of 5α-chloro-6β,19-epoxyandrostane-3β,17-diol 3-acetate.

A stirred mixture of 2 g. of the above compound, 10 ml. of pyridine, and 2 ml. of pivaloyl chloride is slowly heated to 100° C. during one hour and kept at this temperature for 30 minutes. The mixture is then poured into 50 ml. of water with stirring. The precipitate of crude 17β-pivalate slowly solidifies on continued stirring and is collected, washed well with water and dried at 50° C. at high vacuum for 16 hours. The total crude product is then suspended in 20 ml. of methanol and stirred with 0.1 g. of potassium hydroxide at room temperature for 4 hours. The suspension is neutralized with 0.15 ml. of glacial acetic acid and diluted with 20 ml. of water. Filtration and washing with water gives 1.6 g. of crude 5α-chloro-6β,19-expoyandrostane-3β,17-diol 17-pivalate.

To a solution of 1.0 g. of the above 17-pivalate in 10 ml. of acetone, 2.0 ml. of 50% aqueous chromic acid is added over 1 hour with stirring whereupon the mixture is poured into 100 ml. of water. The precipitate of crude 5α-chloro-6β,19-epoxy-17β-hydroxyandrostane-3-one 17-pivalate is collected, washed well with water and dried over calcium chloride overnight. It is then refluxed with 2 ml. of pyridine for 15 minutes. Dilution with water and filtration gives 0.80 g. of crude title compound which is purified by recrystallization from methanol and identified by elemental analysis as well as by NMR spectrography; M.P. 157–158° C., $\lambda_{max}^{EtOH}$ 238 ( ϵ 14,320), $\nu_{max}^{CHCl_3}$ 1715 and 1776 cm.⁻¹

EXAMPLE 2

17β,19-dihydroxyandrost-4-en-3-one 17-pivalate (III)

6β,19-epoxq-17β-hydroxyandrost-4-en-3 - one 17-pivalate, 5.0 g., is treated with 60 g. of zinc dust in 100 ml. of acetic acid in the manner described by Ueberwasser et al., Helv. Chim. Acta., 46, 344, 1963, for the preparation of 19-hydroxyandrost-4-ene-3,17-dione. Extraction of the crude product with ether, followed by recrystallization from methanol, yields the title compound, M.P. 215–218° C.

$\lambda_{max}^{EtOH}$ 239 mμ

EXAMPLE 3

10β,17β-dihydroxyestr-4-en-3-one-10-acetate 17-pivalate (IV)

17β,19-dihydroxyandrost-4-en-3-one 17-pivalate, 1.0 g., is oxidized with 1.0 g. of lead tetraacetate in 50 ml. of benzene by the method of Amorosa et al., Helv. Chim. Acta., 45, 2674, 1962, for the preparation of 10β-hydroxy-estr-4-ene-3,17-dione acetate, except that the use of calcium carbonate is omitted. Extraction of the crude product, followed by recrystallization from methanol gives the title compound; M.P. 208–210° C., $\lambda_{max}^{EtOH}$ 239 mμ

EXAMPLE 4

3-(2-propynyloxy)estra-1,3,5(10)-trien-17β-ol (a) From 3-(2-propynyloxy)estra - 1,3,5(10)-trien-17-one: A suspension of 4.0 g. of 3-(2-propynyloxy)estra-1,3,5(10)-trien-17-one is stirred in a nitrogen atmosphere with 400 mg. of sodium borohydride for 45 minutes. An additional 300 mg. of sodium borohydride is added and stirring is continued. After 1½ hours the reaction mixture is cooled to 5° C. The precipitate is collected and washed with 5 ml. of cold methanol yielding 2.70 g. of white crystals. Recrystallization from methanol gives 1.9 g. of the title compound; M.P. 108.5–110.5° C., $\lambda_{max}^{EtOH}$ 276 mμ ($\epsilon$1824) and 285 mμ ($\epsilon$1716), $\nu_{max}^{CHCl_3}$ 3300 and 2120, 3610 and 3460 cm.$^{-1}$ (b) From estra-1,3,5(10)-triene-3,17β-diol: Estra-1,3,5(10)-triene-3,17β-diol is converted to the title compound by alkylation with 3-bromopropyne employing the method used by Busby et al., J. Med. Chem., 7, 755 (1964) to prepare 3-(2-propynyloxy)estra-1,3,5(10)-trien-17-one.

EXAMPLE 5

Estra-1,3,5(10)-triene-3,17β-diol 3,17-dipivalate

A suspension of 5.0 g. of estra-1,3,5(10)-trien-3,17β-diol in 20 ml. of pyridine is heated with 7.5 ml. of pivaloyl chloride at 100° C. under nitrogen for two hours. The reaction mixture is poured carefully with stirring into 500 ml. of water warmed to 80° C. The resultant solid precipitate is collected, dried at 60° C. and recrystallized from methaol to given the title compound as colourless crystals; M.P. 174–177° C., $\lambda_{max}^{EtOH}$ 278 mμ ($\epsilon$862) and 286 mμ ($\epsilon$850)

EXAMPLE 6

Estra-1,3,5(10)-triene-3,17β-diol-17-pivalate

A suspension of 4.0 g. of estra-1,3,5(10)-triene-3,17β-diol 3,17-dipivalate and 300 mg. of sodium methoxide in 80 ml. of methanol is allowed to stand at room temperature under nitrogen for eight hours. Acetic acid 0.4 ml., is added and the reaction mixture is then concentrated under reduced pressure at 40° C. The resultant residue is triturated with water, and then crystallized from methanol to give the title compound; M.P. 229.5–231.5° C., $\lambda_{max}^{EtOH}$ 280 mμ ($\epsilon$2310)

Alternatively, estra-1,3,5(10)-triene-3,17β-diol 3,17-dipivalate can be treated with dilute hydrochloric acid in methanol to yield the title compound.

EXAMPLE 7

3-(2-propynyloxy)estra-1,3,5(10)-trien-17β-ol pivalate (V)

(a) From 10β,17β - dihydroxyestr-4-en-3-one 10-acetate 17-pivalate (IV): A mixture of 50.0 g. of 10β,17β-dihydroxyestr-4-en-3-one 10-acetate 17-pivalate and 500 ml. of 2-propyn-1-ol with 0.25 ml. concentrated hydrochloride acid is allowed to stand at 50° C. for 24 hours under nitrogen. The reaction mixture is cooled to 5° C. and the precipitate is collected, washed with cold methanol, and dried. Recrystallization of the precipitate from methanol affords the title compound; M.P. 102–103.5° C., $\lambda_{max}^{EtOH}$ 276 mμ ($\epsilon$ 1870) and 284 mμ ($\epsilon$ 1720)

(b) From 3-(2-propynyloxy)estra - 1,3,5(10) - trien-17β-ol: 3 - (2 - propynyloxy)estra - 1,3,5(10) - trien-17β-ol is acylated with pivaloyl chloride in the same manner as described for the preparation of estra-1,3,5(10)-triene-3,17β-diol 3,17-dipivalate in Example 5, to yield the title compound.

(c) From estra - 1,3,5(10) - triene - 3,17β-diol 17-pivalate: Estra-1,3,5(10) - triene-3,17β-diol 17-pivalate, 5.0 g., is treated with 3-bromopropyne in the manner described by Busby et al., J. Med. Chem., 7, 755 (1964), to prepare 3 - (2-propynyloxy)-estra - 1,3,5(10) - trien - 17-one, to yield the title compound.

EXAMPLE 8

A suitable bait for rodent control is prepared by absorbing 0.1% of 3 - (2-propynyloxy)estra - 1,3,5(10)-trien-17β-ol pivalate into the edible carrier cracked corn, using a volatile solvent, such as acetone or methanol, as a carrier. After evaporation of the solvent the bait is treated with 1% by weight of a nonvolatile, edible oil, such as hydrogenated corn oil, followed by a coating of 2% corn-syrup solids and finally dried to about 5% moisture.

In the same manner, by using as edible carrier corn meal, cereal grains, pellets of prepared cereals, bread crumbs, meat or fish scraps, and proceeding as above, suitable baits for rodent control may also be prepared.

What is claimed is:

1. 3 - (2 - propynyloxy)estra - 1,3,5(10) - trien - 17β-ol pivalate.

2. The process of preparing 3-(2-propynyloxy)estra-1,3,5(10)-trien-17β-ol pivalate, comprising treating 10β, 17β - dihydroxyestr - 4 - en - 3 - one 10-acetate 17-pivalate with 2-propyn-1-ol in the presence of an acid.

3. A bait for rodent control which comprises 3-(2-propynyloxy)estra - 1,3,5(10)-trien-17β-ol pivalate supported on an edible carrier.

4. The method of controlling rodent populations, comprising introducing into the diet of said rodents as an estrogenic compound 3-(2-propynyloxy)estra-1,3,5(10)-trien-17β-ol pivalate.

No references cited.

HENRY A. FRENCH, Primary Examiner

U.S. Cl. X.R.

260—239.55, 397.4, 397.5; 424—17, 84